Sept. 29, 1970     W. P. HENDRIX     3,531,084

MULTIPORT VALVE

Filed Sept. 9, 1968

INVENTOR
Warren P. Hendrix

BY Jones & Thomas

ATTORNEYS

United States Patent Office 3,531,084
Patented Sept. 29, 1970

3,531,084
MULTIPORT VALVE
Warren P. Hendrix, Lawrenceville, Ga., assignor to Micromeritics Instrument Corporation, Norcross, Ga., a corporation of Georgia
Filed Sept. 9, 1968, Ser. No. 758,432
Int. Cl. F16k *5/04*
U.S. Cl. 251—314                                    17 Claims

ABSTRACT OF THE DISCLOSURE

A multiport valve for use in selectively controlling the flow of fluid from one conduit to at least one other conduit including a housing, at least two conduit fittings, a rotatable core and quad rings sealingly positioned between the base of the fittings and the outer surface of the rotatable core.

---

The present invention concerns a multiport valve for use in selectively controlling the flow of a fluid, such as a gas or liquid, between conduits. More particularly the present invention concerns a multiport valve which efficiently establishes a sealed communicating relationship between conduits through a housing having a rotatable core in which alignable passages are defined.

In conventional valves a rotatable core selectively controls the flow of fluid between two passages in the housing. In the past, difficulties have arisen relating to means and methods for creating an adequate sealing relationship between core and housing so that fluid flows only when desired and only to and through the selected passage. The various unsuccessful attempts to solve this problem include coating the rotatable core with a greasy nonporous substance and milling a reception area in the core around a transfer passage in which a sealing substance or formed elastomeric compound is placed to seal against the inner surface of the housing. Both such solutions have proven unsatisfactory and unacceptable in the field of the present invention.

It is therefore an object of the present invention to provide an efficient and effective multiport valve.

Another object of the present invention is to provide a multiport valve having a housing which contains a central rotatable core which sealingly engages entrance and exit fittings of the housing.

These and other objects, features and advantages of the present invention will be apparent to those skilled in the art from a consideration of the following description when taken in conjunction with accompanying drawings in which.

Figure 1:
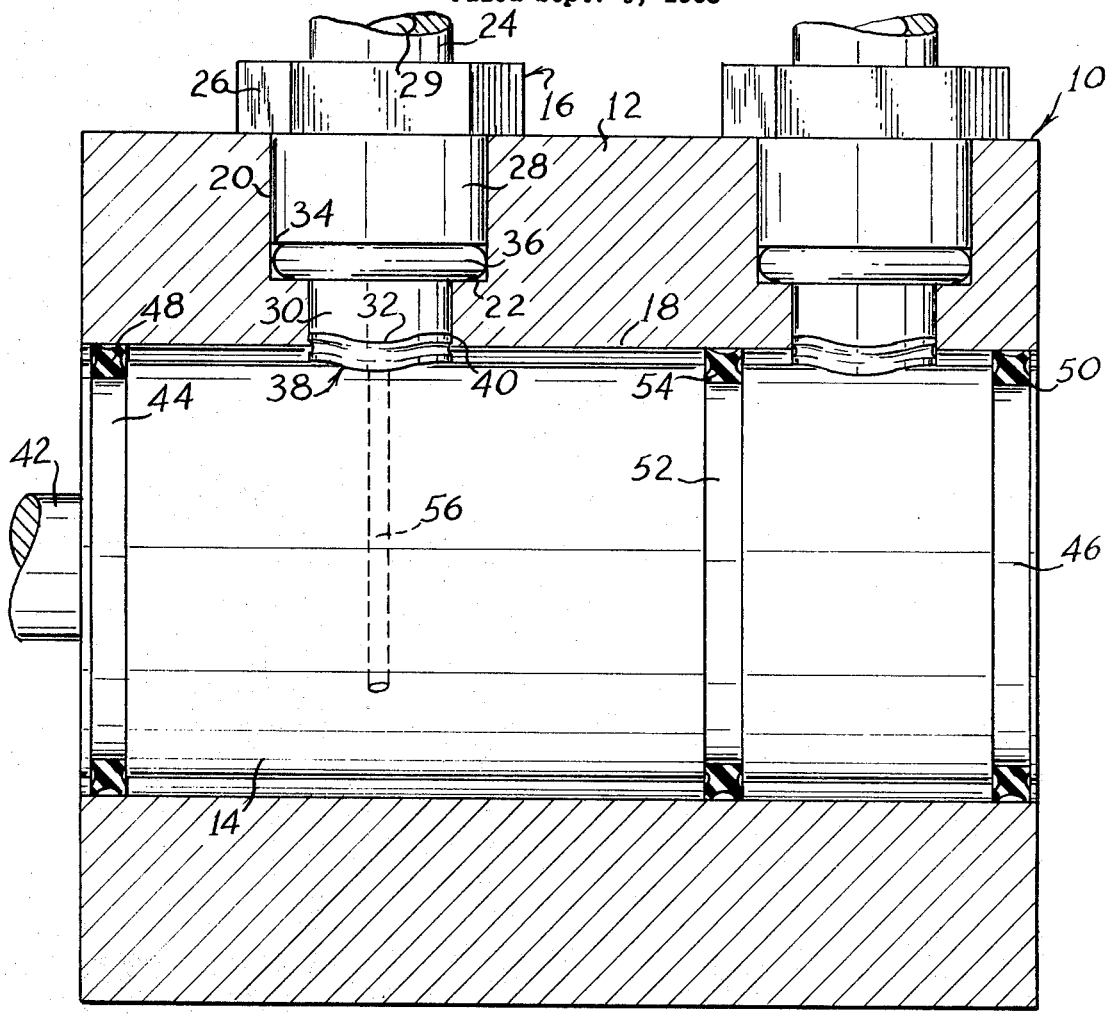
FIG. 1 is a side elevational view of the multiport valve with the housing and three quad rings in cross section.

Referring now more particularly to the drawing wherein like characters of reference refer to like parts throughout and to that embodiment chosen for purposes of illustration, it will be seen that the multiport valve generally includes a hollow housing 12, a central rotatable core 14 and a conduit fitting 16. Housing 12 is typically constructed of durable metallic material such as aluminum and defines a generally cylindrical bore extending longitudinally therethrough. The arcuate inner surface 18 surrounding the bore has a uniform radius of curvature about the longitudinal axis of the housing. Inner surface 18, however may vary in radius of curvature along the passageway if such an arrangement is desired. The housing of the valve also defines at least two ports 20 which extend radially through the wall of the housing to intersect the bore. Port 20, in this embodiment, is cylindrical in configuration and includes an inner, annular shoulder 22 defined by the housing and disposed between the exterior and inner surfaces thereof. The opposing walls of the port are parallel but may slope inwardly toward shoulder 22 to provide a gripping surface for fitting 16. In addition, it is conceivable that port 20 could be rectangularly or squarely shaped. Essentially, the walls of the port must conform closely to the exterior walls of fitting 16 so that a sealing and retaining engagement between the two may be established.

Positioned within port 20 is fitting 16 which is composed of an exterior neck 24, hexagonal body 26, lower trunk 28 and interior, longitudinal passageway 29 which communicates with both ends of the fitting. Trunk 28 includes a lower shaft 30 having an arcuately shaped base surface 32. Shaft 30 is smaller in cross section than trunk 28 creating thereby annular platform 34 at the junction of the lower shaft and the trunk. An elastomeric O-ring 36 of circular cross section is disposed around shaft 30 between platform 34 and shoulder 22 of the housing. The exterior diameter of trunk 28 is slightly larger than the interior diameter of port 20 (normally $\frac{1}{1000}$ inch to $\frac{2}{1000}$ inch larger) so that a conventional press-fit between fitting and housing may be established. Fitting 16 is preferably constructed of a metallic material, such as brass, which is harder than the housing. During the press-fit operation housing 14 expands slightly to receive fitting 16 in a secure engagement. Even though it is not desired, oftentimes fitting 16 shears the walls of port 20. If such should happen, the shearings may collect in the space surrounding O-ring 36 and not interfere with a successful and effective press-fit.

As fitting 16 is press-fit into port 20, O-ring 36 compresses and creates an additional seal between its exterior surface and the interior surface of the port. In addition, the presence of compressible O-ring 36 permits vertical adjustment or fine selection of the vertical position of fitting 16 within the port.

Figure 2:
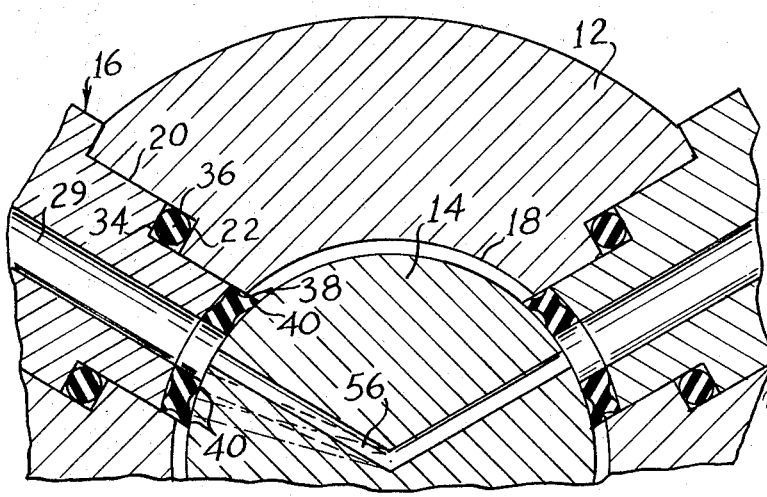
FIG. 2 is a cross-sectional view of the multiport valve including two fittings, portions of the valve being broken away.

Lower shaft 30 is of a length such that base surface 32 is spaced interiorly from inner surface 18 of the housing when the fitting is properly positioned. This arrangement creates a space between the interior surface of the housing and the base surface 32 of the lower shaft of the fitting. Received within this space is a means for sealing the base surface of the fitting to the outer surface of the core, such as an elastomeric quad-ring 38. As shown in FIG. 2, quad-ring 38 has concave exterior surfaces which create pairs of sealing areas at each pair of raised edges 40. As quad-ring 38 is positioned within the space below surface 32 and core 14 is positioned within the housing, the ring is inwardly deformed and assumes the arcuate shape of base surface 32. The quad-ring has a cross-sectional thickness sufficient to cause edges 40 of the ring to sealingly engage the outer surface of the core. Thus it may be seen that the arcuate shape of base surface 32 is critical to the inventive concept of the present invention.

Base surface 32 has a curvature which is concentric with the curvature of core 14. Therefore, the radius of curvature for base surface 32 is increased over the radius of curvature of core 14 by a factor determined according to the desirable depth of the space between base surface 32 and inner surface 18 of the housing.

By assuming the shape of base surface 32, quad-ring 38 inherently assumes a proper lower sealing surface curvature for creating a seal between fitting 16 and core 14.

Quad-ring 38 should exceed in cross-sectional width, the diameter of the orifices of the passages of core 14 so that rotation of core 14 about its axis will permit the complete coverage of the orifice of a passage by the quad-ring before the core is moved to a position of disassociation between fitting 16 and the passages of the core. Since other fittings in the housing should be designed in a similar fashion, there would be no period in which several core passages would be partially opened to receive fluids from other partially opened passages.

O-ring 36 and quad-ring 38 are formed from elastomeric material such as rubbery compositions and neoprene compositions. Both are designed to effect a sealing relationship between parts of the present embodiment. Quad-ring 38 performs admirably as a sealing ring between a fixed body and a moving body because it maintains its general dimensional configuration without rolling in the direction of rotation of the core. O-ring 36, on the other hand, performs suitably in its position by creating spaces for reception of shearings, rolling up tightly against platform 34 as the fitting is press-fit into place, and creating a seal between fitting 16 and housing 12.

It should be understood that additional fittings may be positioned within housing 12 and at least one fitting for entrance of fluids and one exit conduit such as another fitting are required for successful operation of the present invention.

Rotatably and centrally positioned within the bore of housing 12 is core 14. Extending from one end of the core is drive shaft 42 through which rotational force is exerted upon core 14. Annular grooves 44 and 46 are formed in the ends of the core and receive core quad-rings 48 and 50, respectively. The core quad-rings seal the ends of the core to the housing 12 to prevent the entrance of contaminating fluids and trash or the inadvertent exit of transferring fluids. In addition, these rings help maintain the core in its proper aligned position within the housing. An additional intermediate annular groove 52 receives intermediate quad-ring 54 which seals one set of fittings from another set of fittings so that inadvertent exchange of fluids between sets of fittings does not occur.

Defined within core 14 is a transfer passage 56 having one orifice which aligns with one fitting and another orifice which aligns with a second fitting at one position of the core. When in this aligned position, fluid flows inwardly from a source (not shown) through one fitting such as a fitting 16 and into the aligned orifice of transfer passage 56. The fluid flows through passage 56 and outwardly through the orifice which as aligned with a second fitting and through such second fitting to a destination (not shown). By rotation of core 14, the aligned orifices may be moved out of association with the entrance and exit fittings. In this position, the entrance fitting is sealed to the solid surface of the core and no fluid is transferred between the two fittings.

By arranging several fittings and corresponding transfer passages along the length of the microvalve, each in a different aligned communicating relationship, rotation of core 14 through several degrees of rotation will align and misalign individual sets of fittings and transfer passages. In addition, various radially extending passages may intersect a central longitudinal passage to provide an interconnected series of passages. The multiport valve thus may become a multitransfer, multistage valve, capable of handling the transfer of several different fluids.

An additional fitting may be positioned within housing 12 and a vacuum may be drawn through such fitting so that transfer passages within the core may be cleared of fluids by indexing each transfer passage with the fitting and drawing the vacuum.

While the invention has been described in detail with particular reference to preferred embodiments thereof, it will be understood that variations and modifications can be effected within the spirit and scope of the invention as described hereinbefore and as defined in the appended claims.

I claim:

1. A multiport valve for selectively transferring fluid from a source to a destination comprising:

a hollow housing having an exterior surface and an interior surface defining an inner generally cylindrically shaped bore, said housing having at least two ports extending between the interior surface and the exterior surface of the housing;

a central, generally cylindrically shaped core disposed within the bore of the housing, said core having an outer surface with a radius of curvature and said core having a transfer passage defined therethrough so that, at one position of the core within the housing, an orifice of the passage aligns with one of the two ports and another orifice of the passage aligns with another of the two ports;

a hollow fitting disposed within each of the two ports of the housing, each fitting defining a longitudinal passageway and having a base surface which is arcuately shaped with a radius of curvature which is greater than the radius of curvature of the outer surface of the core, the fitting being constructed and arranged so that the base surface is positioned outwardly of the interior surface of the housing to create a space between the base surface of the fitting and the interior surface of the housing and so that the base surface is concentric with the outer surface of the core, and a means for sealing the base surface of the fitting to the outer surface of the core positioned within the space between the base surface of the fitting and the interior surface of the housing and conforming in configuration to the base surface of the fitting.

2. The multiport valve of claim 1 wherein the means for sealing the base surface of the fitting to the outer surface of the core comprises an elastomeric ring of noncircular cross section.

3. The multiport valve of claim 2 wherein the elastomeric ring is an elastomeric quad-ring.

4. The multiport valve of claim 1 wherein a means for sealing a fitting to the housing is disposed in a cavity formed between an annular platform defined by the fitting and an interior annular shoulder defined by a port.

5. The multiport valve of claim 4 wherein the means for sealing a fitting to the housing comprises an elastomeric ring.

6. The multiport valve of claim 5 wherein the elastomeric ring is of circular cross section.

7. The multiport valve of claim 5 wherein the elastomeric ring provides space in the cavity for receiving shearings which are created during the positioning of the fitting within the port.

8. The multiport valve of claim 1 wherein the housing and a fitting are formed from two different metallic materials of unequal hardness.

9. The multiport valve of claim 3 wherein the cross-sectional width of the elastomeric quad-ring exceeds the diameter of an orifice of the passage.

10. The multiport valve of claim 1 wherein the interior surface of the housing has a uniform radius of curvature.

11. The multiport valve of claim 1 wherein the passage is radially disposed with respect to the longitudinal axis of the core.

12. The multiport valve of claim 3 wherein the elastomeric quad-ring has a cross-sectional thickness sufficient to cause sealing edges of the quad-ring to sealingly engage the outer surface of the core.

13. In a valve comprising a housing defining a bore, a core received within the bore and having a radius of curvature about an axis, said core defining a transfer passage therethrough, and at least two conduit fittings extending through said housing, the improvement of at least one of said two conduit fittings having a concave base surface displaced outwardly from the bore to define a space between the base surface of the fitting and the bore, said base surface having an axis substantially coaxial with the axis of said core and a radius of curvature greater than the radius of curvature of the core; and of sealing means positioned within said space between the base surface and the bore.

14. The valve of claim 13 wherein said sealing means comprises an elastomeric ring of noncircular cross section.

15. In a valve having a housing and a core which is rotatable within a bore formed in the housing and which has a cylindrical surface with a first radius of curvature, a fitting inserted into said housing and having an inner surface which is displaced outwardly from said cylindrical surface and which has a second radius of curvature greater than said first radius of curvature, and a connecting means positioned between said inner surface and said cylindrical surface for connecting a first passage within said fitting to a second passage within said core.

16. The valve of claim 15 in which said fitting is inserted into a port formed in said housing and in which said fitting and said port are shaped to define a cavity around said fitting that is positioned within said housing to receive metal sheared from said housing as said fitting is forced into said port.

17. The valve of claim 15 in which said inner surface is concentric with said cylindrical surface.

References Cited
UNITED STATES PATENTS

| | | | |
|---|---|---|---|
| 904,559 | 11/1908 | Paulson | 137—625.16 |
| 1,776,615 | 9/1930 | Boothman et al. | 285—329 X |
| 2,485,915 | 10/1949 | Parker | 251—317 |
| 2,929,406 | 3/1960 | Anderson | 251—317 X |
| 3,387,817 | 6/1968 | Seguenot | 251—317 |

M. CARY NELSON, Primary Examiner

R. B. ROTHMAN, Assistant Examiner